July 28, 1970  H. W. VERLINDEN  3,522,379
TESTING OF DECODERS FOR F.M. RECEIVERS AND TEST
SIGNAL GENERATORS FOR USE IN SUCH TESTING
Filed Feb. 28, 1968  3 Sheets-Sheet 3

Harry W. Verlinden
INVENTOR.

BY

PATENT AGENT

United States Patent Office 3,522,379
Patented July 28, 1970

3,522,379
TESTING OF DECODERS FOR F.M. RECEIVERS AND TEST SIGNAL GENERATORS FOR USE IN SUCH TESTING
Harry W. Verlinden, Waterloo, Ontario, Canada, assignor to Electrohome Limited, Kitchener, Ontario, Canada
Filed Feb. 28, 1968, Ser. No. 709,132
Int. Cl. H04j 1/16
U.S. Cl. 179—15                31 Claims

ABSTRACT OF THE DISCLOSURE

A test signal generator produces a test signal for aligning a multiplex decoder. A switching signal is applied to two input terminals of two gating devices, while an audio signal is applied to two other input terminals of the two gating devices. The audio signal appears at the output terminals of the gating devices in the form of pulses of audio signal that occur during certain time intervals at one output terminal and different time intervals at the other output terminal. These latter signals are supplied to multiplex encoder that produces a conventional composite signal of the form $$(L+R)+(L-R)\cos \omega t + P \cos \frac{\omega}{2}t$$

---

This invention relates to apparatus for use in and methods for testing and aligning F.M. multiplex decoders.

In accordance with regulations currently prescribed by the F.C.C. in the United States and D.O.T. in Canada, the composite signal for use in F.M. multiplex transmission must have the following mathematical form:

$$M(t) = (L+R)+(L-R)\cos \omega t + P \cos \frac{\omega}{2}t$$

where $M(t)$ is the composite signal
L is the left channel audio signal
R is the right channel audio signal
P is the pilot carrier amplitude
$\omega = 2\pi f$, $f$ presently being 38 kHz.

In the foregoing equation, $(L+R)$ is the sum of the left and right audio channel signals and, therefore, is called the monophonic signal. An F.M. receiver which is not equipped to reproduce stereophonic signals will reproduce the $(L+R)$ signal only. $(L-R)\cos \omega t$ represents the difference between the left and right audio channel signals amplitude modulated onto a 38 kHz. carrier which is suppressed prior to transmission of the composite signal.

$$P \cos \frac{\omega}{2}t$$

is a 19 kHz. pilot carrier.

It will be noted that the amplitude modulated carrier (38 kHz.) is harmonically related to the pilot carrier (19 kHz.) the frequency of the latter being exactly one-half of the frequency of the former. In addition, the amplitude modulated carrier and the pilot carrier are in phase. The pilot carrier is a necessary part of the composite signal, since it serves the function of reintroducing the suppressed 38 KHz. carrier into the composite signal in the F.M. multiplex receiver. It can be said that the pilot carrier is a synchronization signal for the correct decoding of the composite signal at the receiver.

In addition to the foregoing components, the composite signal may contain an S.C.A. signal for store casting or subscription music transmission, the use of this signal by the broadcaster being optional. The bandwidth of the S.C.A. channel presently is 67±7 kHz.

The monophonic signal can frequency modulate the F.M. broadcast carrier up to 80%, is S.C.A. is present, or up to 90% with no S.C.A. of the maximum modulation ±75 kHz.) permitted by the F.C.C. and D.O.T. regulations. The stereophonic signal also can modulate up to 80% of the maximum modulation if S.C.A. is present, this figure being 90% with no S.C.A. The pilot carrier modulates up to 10% i.e. ±7.5 kHz. assuming 100% modulation to be ±75% kHz. Thus, for F.M. multiplex transmission present regulations require an R.F. signal which may be modulated by the following signals in the noted frequency bands:

$L+R$ from 0 to 15 kHz.
$L-R$ in the form of $\pm(0$ to 15) kHz. sidebands of 38 kHz. sub-carrier with carrier suppressed and in the band 23 to 53 kHz.
A pilot carrier at 19 kHz.
A subsidiary carrier (S.C.A.) having a bandwidth from 60 to 74 kHz.

In an F.M. multiplex receiver a decoder must be provided to derive the audio L and R signals and separate them from each other for individual reproduction. Before such a decoder can be used effectively, it must be aligned and the two channels thereof each adjusted for maximum output.

In accordance with this invention, there are provided methods and apparatus for generating a test signal that is useful in the alignment of F.M. multiplex decoders.

There is generally some degree of cross talk between the two channels of an F.M. multiplex decoder. It is essential for acceptable sound reproduction that the degree of cross talk be kept low. Consequently, the degree of cross talk that is obtained with an F.M. multiplex decoder is an important characteristic of the decoder.

In accordance with this invention there are provided methods and apparatus for determining the degree of cross talk between the two channels of an F.M. multiplex decoder.

Apparatus embodying this invention produces a test signal for testing the alignment of a multiplex decoder for an F.M. receiver. The apparatus includes means for providing a switching signal, each cycle of the switching signal being constituted by a first pulse that goes towards one polarity and occurs during a first time interval followed by a second pulse that goes towards the opposite polarity and that occurs during a second time interval, the latter being after the former. Means are provided to generate a second signal having a frequency greater than the frequency of the switching signal. There are first and second gating means each having two input terminals and an output terminal. The switching signal and the second signal are applied to the two input terminals respectively of the first gating means as well as the two input terminals respectively of the second gating means. The gating means are so designed that the second signal appears at the output terminal of the first gating means during the first time interval, but not during the second time interval, whereas it appears at the output terminal of the second gating means during the second time interval, but not during the first time interval. Means are connected to the output terminals for producing a signal of the form $$(L+R)+(L-R)\cos \omega t + P \cos \frac{\omega}{2}t$$

L being the signal appearing at one of the output terminals, R being the signal appearing at the other of the output terminals, and P being the amplitude of the pilot carrier.

This invention will become more apparent from the following detailed description, taken in conjunction with the appended drawings, in which:

FIG. 1a shows the modified part of a modification of the system of FIG. 1;

Figure 1:
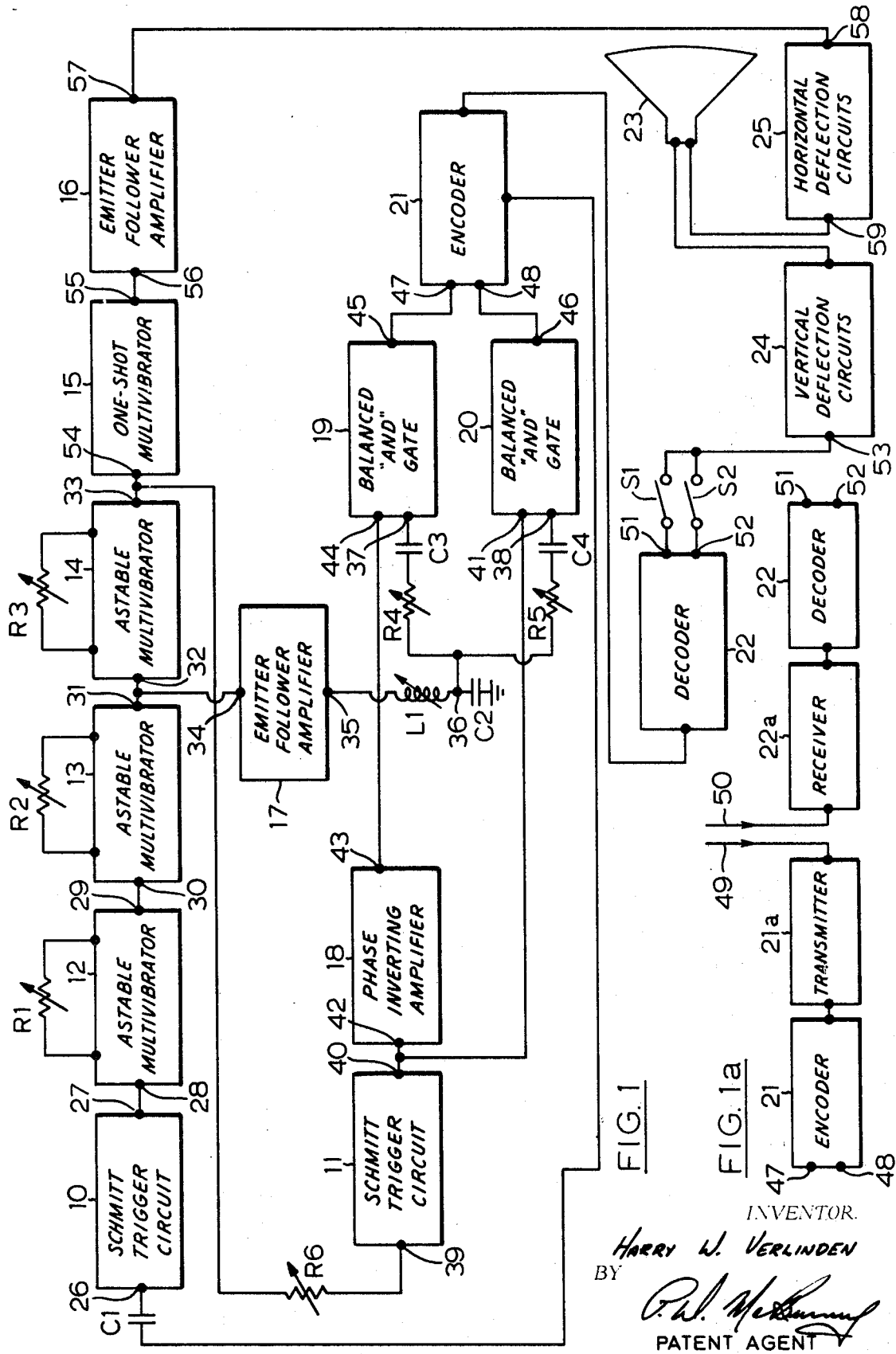
FIG. 1 shows a complete system for testing the alignment of an F.M. multiplex decoder, the system including apparatus embodying this invention for producing a test signal for testing the alignment of the decoder.
Figures 3, 4:
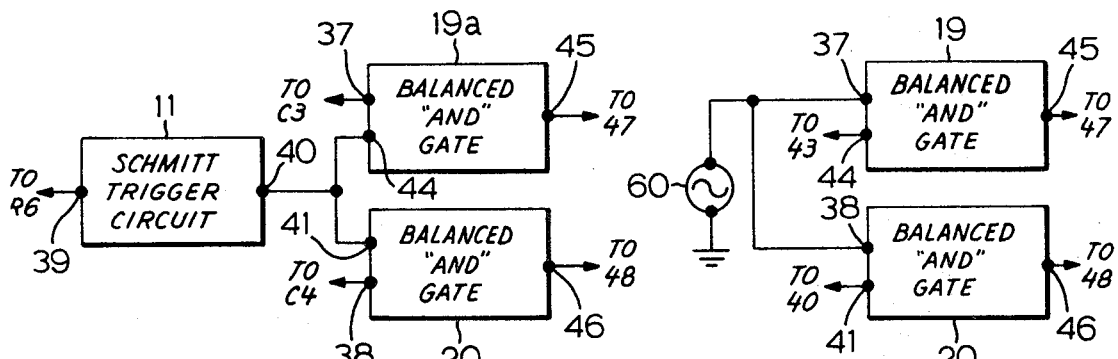
Figure 5:
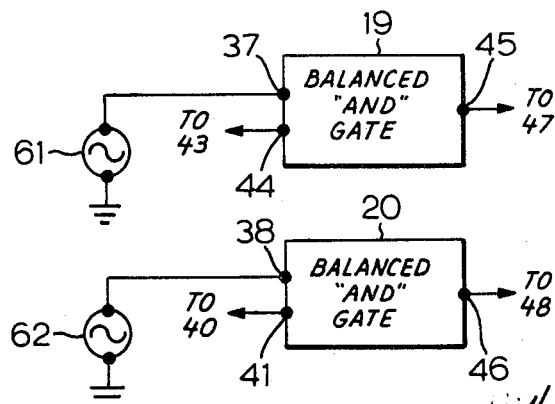
Figure 6:
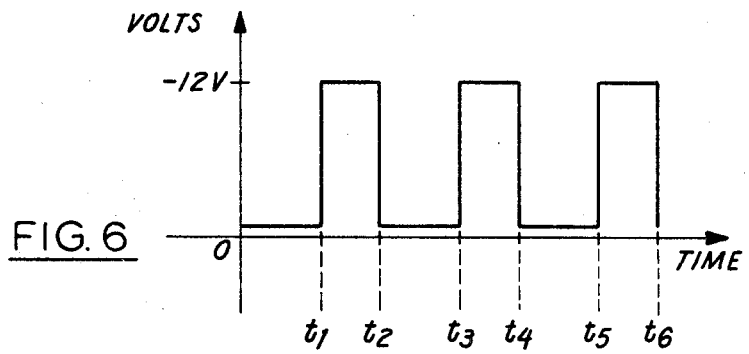
Figure 7:
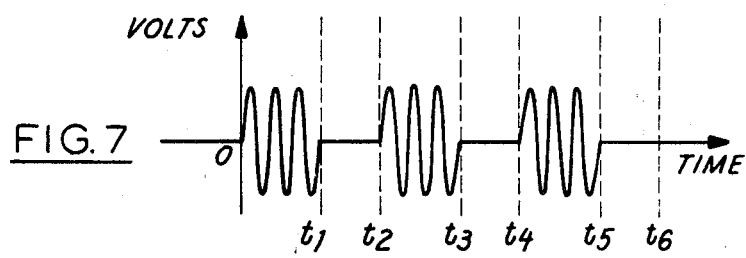
Figure 8:
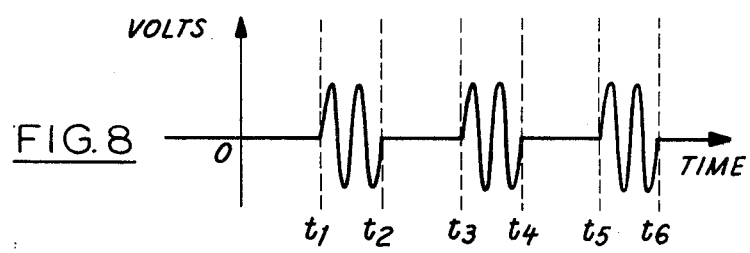

FIGS. 3 to 5 inclusive show different embodiments of a part of the system of FIG. 1; and FIGS. 6 to 8 show various voltage waveforms appearing at different points in the system of FIG. 1.

Referring to FIG. 1, the system shown therein includes two Schmitt trigger circuits 10 and 11, or other squaring amplifiers, three astable multivibrators 12, 13 and 14, a one-shot multivibrator 15, two emitter follower amplifiers 16 and 17, a phase inverting amplifier 18, two identical balanced "AND" gates 19 and 20, a multiplex encoder 21, a multiplex decoder 22 and an oscilloscope including a cathode ray tube 23, vertical deflection circuits 24 and horizontal deflection circuits 25.

A part of the 19 kHz. pilot carrier (sine wave) of the composite signal being generated by encoder 21 or, alternatively, a part of the 38 kHz. sub-carrier, is derived from encoder 21 and applied via a capacitor C1 to the input terminal 26 of Schmitt trigger circuit 10 and is converted to a square wave. Thus, there appears at the output terminal 27 of Schmitt trigger circuit 10 a square wave having a frequency of 19 kHz. This signal is applied to the input terminal 28 of astable multivibrator 12. The output terminal 29 of astable multivibrator 12 is connected to the input terminal 30 of astable multivibrator 13, while the output terminal 31 of astable multivibrator 13 is connected to the input terminal 32 of astable multivibrator 14. Astable multivibrator 12 is set to divide its input signal by three, while astable multivibrators 13 and 14 are set to divide their input signals by six and twelve respectively. Correct division by each of the astable multivibrators can be ensured by correctly adjusting the fine tuning resistors R1, R2 and R3 associated with astable multivibrators 12, 13 and 14 respectively. The signal appearing at output terminal 29 is a substantially square wave having a frequency of 6,333 Hz. The signal appearing at output terminal 31 is a substantially square wave having a frequency of 1,055 Hz. The signal appearing at the output terminals 33 of astable multivibrator 14 is a substantially square wave having a frequency of 88 Hz.

Output terminal 31 of astable multivibrator 13 also is connected to the input terminal 34 of emitter follower amplifier 17, so that the 1,055 Hz. signal that appears at output terminal 31 also is applied to emitter follower amplifier 17, which serves as impedance matching function. The output terminal 35 of this amplifier is connected via a variable inductance coil L1 and a capacitor C2 to ground. Coil L1 and capacitor C2 constitute a series tuned circuit that has a low impedance at resonance and that is tuned to the frequency of 1,055 Hz. Thus, there is derived at the common terminal 36 of coil L1 and capacitor C2 a sine wave having a frequency of 1,055 Hz. This signal is applied via variable, level adjusting resistors R4, R5 and blocking capacitors C3 and C4 to the input terminals 37 and 38 of balanced "AND" gates 19 and 20 respectively. By adjusting resistors R4 and R5 one can ensure that the signals appearing at the output terminals of gates 19 and 20 are at the same level.

The 88 Hz. substantially square wave signal appearing at output terminal 33 is applied via a variable resistor R6 to the input terminal 39 of Schmitt trigger circuit 11, which "squares" the input signal. A suitable switching signal for balanced "AND" gates 19 and 20 in the form of a square wave having a frequency of 88 Hz. appears at the output terminal 40 of Schmitt trigger circuit 11. This signal is applied directly to one input terminal 41 of balanced "AND" gate 20 and to the input terminal 42 of phase inverting amplifier 18. The output terminal 43 of phase inverting amplifier 18 is connected to the input terminal 44 of balanced "AND" gate 19, so that precisely the same switching signal is applied to both input terminals 41 and 44, except that the signals are 180 degrees out of phase with respect to each other.

The output terminals 45 and 46 of balanced "AND" gates 19 and 20 respectively are connected to the input terminals 47 and 48 respectively of multiplex encoder 21. The signal applied to input terminal 47 is the L signal, i.e., the left channel audio signal, while the signal applied to input terminal 48 is the R signal, i.e., the right channel audio signal. These signals are supplied to encoder 21 that produces a composite signal having the form previously noted herein, and this composite signal is supplied via cable to decoder 22. Alternatively, as shown in FIG. 1a, the composite signal may be modulated upon a carrier frequency in the F.M. band in a transmitter 21a and the resultant signal transmitted by the antenna 49 of transmitter 21a. It is received by the antenna 50 of a receiver 22a which has its output terminal connected to the input terminal of decoder 22. In either case decoder 22 has left and right audio output signal terminals 51 and 52 respectively. Normally these audio output signal terminals each are connected to a different loudspeaker for stereophonic reproduction. However, in order that the decoder may be tested, in the present instance these terminals are connected via switches S1 and S2 respectively to the input terminal 53 of the vertical deflection circuits 24 of the oscilloscope. Alternatively, two oscilloscopes may be provided. Switches S1 and S2 then are not necessary, and output terminals 51 and 52 each can be connected to a different one of the vertical deflection circuits of the two oscilloscopes.

Output terminal 33 of astable multivibrator 14 also is connected to the input terminal 54 of one-shot multivibrator 15, the output terminal 55 of one-shot multivibrator 15 being connected to the input terminal 56 of emitter follower amplifier 16, which serves an impedance matching function. The output terminal 57 of emitter follower amplifier 16 is connected to the input terminal 58 of the horizontal deflection circuits 25 of the oscilloscope. Consequently, there appears at output terminal 57 a train of negative-going pulses occurring at a frequency of 88 Hz. These pulses are applied to input terminal 58 and result in a sawtooth deflection voltage occurring at the output terminal 59 of horizontal deflection circuits 25 at a frequency of 88 Hz., this sawtooth voltage being applied to the horizontal deflection plates of cathode ray tube 23.

The square wave signal appearing at output terminal 40 of Schmitt trigger circuit 11 is shown in FIG. 6. It will be noted that pulses having the less negative level are slightly longer in duration than the pulses having the more negative level. This result is achieved deliberately by appropriately setting variable resistors R6, and the purpose of making the positive-going pulses of the square wave of longer duration than the negative-going pulses is to permit ready identification of the L and R signals. The signal shown in FIG. 6 is applied to input terminal 41 of balanced "AND" gate 20, while the exact same signal as shown in FIG. 6 but 180 degrees out of phase with respect thereto is applied to input terminal 44 of balanced "AND" gate 19. A sine wave signal having a frequency of 1,055 Hz. is continuously applied to both input terminals 37 and 38 of balanced "AND" gates 19 and 20 respectively. Each of the balanced "AND" gates 19 and 20 is designed so that no output signal will be produced except during the time that a positive-going pulse is being applied to its input terminals 44 or 41 respectively. Consequently, balanced "AND" gate 20 only permits the 1,055 Hz. signal applied to its input terminal 38 to appear at its output terminal 46 during time intervals 0–T1, T2–T3, T4–T5, etc. (see FIG. 6). During time intervals T1–T2, T3–T4, T5–T6, etc., no signal appears at output terminal 46. Thus, the form of the output signal appearing at output terminal 46 is as shown in FIG. 7 and consists of regularly recurring pulse trains having a frequency of 1,055 Hz. and that occur during time intervals 0–T1, T2–T3 and T4–T5, etc. As aforementioned, the square wave signal applied to input terminal 44 is 180 degrees out of phase with respect to the signal shown in FIG. 6, and balanced "AND" gate 19 also is of a type that will be open only when positive-going pulses are applied to its input terminal 44. The signal appearing at output terminal 45 of balanced "AND" gate 19 is shown in FIG. 8 and consists of regularly recurring pulse trains having a frequency of 1,055 Hz. and occurring during time intervals T1–T2, T3–T4, T5–T6, etc.

Figure 2:
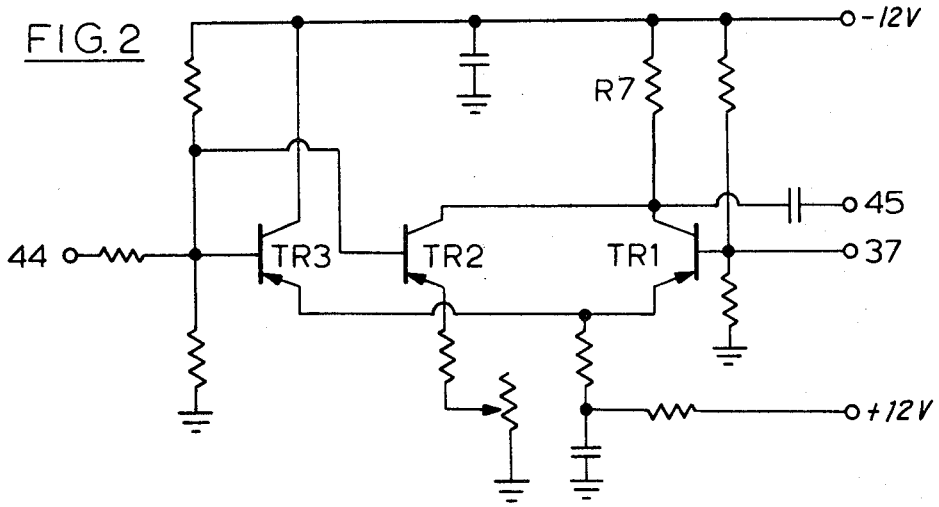
FIG. 2 is a circuit diagram of one of the balanced "AND" gates of FIG. 1.

The circuit diagram of balanced "AND" gate 19 is shown in FIG. 2. The circuit diagram of balanced "AND" gate 20 would be identical, except that its three terminals would be numbered 38, 46 and 41 rather than 37, 45 and 44 respectively. Each balanced "AND" gate is designed to switch an audio signal (1,055 Hz.) on and off without introducing a changing DC level or a switching pulse. The 1,055 Hz. audio signal is applied to the base electrode of a transistor TR1 and the output signal is taken off across a resistor R7 in the collector circuit of transistor TR1. A square wave signal corresponding to that shown in FIG. 6 but 180 degrees out of phase with respect thereto is applied to the base electrode of a transistor TR3 and to the emitter electrode of transistor TR1 causing transistor TR1 to switch on and off. When transistor TR1 is switched off by the square wave applied to its emitter electrode, no audio signal is developed across resistor R7. However, resistor R7 also is connected in the collector circuit of a transistor TR2, while the base electrode of transistor TR2 is connected to square wave input terminal 44. Consequently, when transistor TR1 is turned off, transistor TR2 will be turned on. Thus, the current flowing through common collector resistor R7 will remain constant, and no DC switching pedestal will be developed at output terminal 45, as may be seen with reference to FIG. 8.

The audio signals shown in FIGS. 7 and 8 are applied to input terminals 48 and 47 of multiplex encoder 21 which produces a composite signal having the form previously noted herein. The composite signal is applied to decoder 22 and decoded thereby. Thus, the signal shown in FIG. 7 appears at output terminal 52, while the signal of FIG. 8 appears at output terminal 51. In order to properly align the decoder, the aligner may close switch S1. The signal shown in FIG. 8 then will be displayed on cathode ray tube 23. The display will be stable because the 88 Hz. sawtooth deflection voltage at output terminal 59 is a submultiple or sub-harmonic of and derived from the same signal as the 1,055 Hz. signal of FIG. 8. The aligner can make whatever adjustments are necessary to maximize left channel output. He also will be able to observe during time intervals 0–T1, T2–T3, T4–T5, etc., the amount of cross talk in the left channel introduced from the right channel. Similarly, by opening switch S1 and closing switch S2, the signal shown in FIG. 7 will be displayed on cathode ray tube 23, and the aligner can adjust the right channel for maximum output. During time intervals T1–T2, T3–T4, T5–T6, etc., he can observe the amount of cross talk in the right channel introduced from the left channel.

If two oscilloscopes are employed, the signals at both terminals 51 and 52 can be observed at the same time.

If it is desired to view more than one cycle, say two cycles, of each of the signals at terminals 51 and 52, this can be achieved simply by inserting a divide-by-two astable multivibrator between terminals 33 and 54, thereby providing a sweep frequency of 44 Hz.

While it is very desirable that the signals applied to input terminal 58, input terminals 41 and 44 and input terminals 37 and 38 be derived from and sub-harmonics of either the 19 kHz. pilot carrier or the 38 kHz. subcarrier, this is not absolutely essential. While it is important that the frequency of the horizontal deflection voltage at terminal 59 be the same frequency as or a submultiple of the frequency of the signals that switch gates 19 and 20, it is not essential to achieve this result to employe the circuitry shown in FIG. 1. It would be possible, for example, to rely upon internal sync in the oscilloscope.

It is not essential for the frequency of the signals applied to terminals 37 and 38 to be a multiple or harmonic of the frequency of the horizontal deflection voltage at terminal 59. If such is not the case, however, the display seen on cathode ray tube 23 will move, and this is not particularly desirable. Another alternative would be to derive the sine wave signal applied to input terminals 37 and 38 from any suitable source without the signal being harmonically related to either the signal applied to input terminal 58 or the signals applied to input terminals 44 and 41. Such a system is shown in FIG. 4 where a sine wave generator 60 is connected to input terminals 37 and 38 of balanced "AND" gates 19 and 20 respectively. It must be appreciated, however, that with such a system, the sine wave signal seen on cathode ray tube 23 will not remain stationary unless its frequency is a multiple of the horizontal deflection voltage frequency and the frequency of the switching signals applied to gates 19 and 20.

Another embodiment of the invention is shown in FIG. 5 wherein separate sine wave generators 61 and 62 are connected to input terminals 37 and 38 respectively.

The frequency of the signal applied to terminals 37 and 38 may vary widely.

However, in order that decoder 22 can be aligned properly, the aligner generally will wish to see at least one full cycle of the audio signal applied to terminals 37 and 38. To achieve this result, the frequency of the audio signals will have to be at least twice the frequency of the switching signals for gates 19 and 20. At the upper end the frequency of the audio signals is determined by the bandwidth of the decoder and generally will be less than 15 kHz., preferably less than 1.5 kHz. so as to void deemphasis.

Phase inverting amplifier 18 may be omitted if one balanced "AND" gate is constructed using PNP transistors and the other is constructed using NPN transistors. Thus, as shown in FIG. 3, output terminal 40 of Schmitt trigger circuit 11 can be directly connected to input terminals 44 and 41 respectively of balanced "AND" gates 19a (constructed using NPN transistors) and 20, so that the signal shown in FIG. 6 will be applied to both balanced "AND" gates. However, because one of the gates will employ PNP transistors, i.e., gate 20, while the other will employ NPN transistors, the same output signals as shown in FIGS. 7 and 8 will be obtained.

Those skilled in the art will appreciate that many modifications of the system of FIG. 1 are possible. Thus, other circuits than astable multivibrators could be employed to produce the signals of the desired frequencies that are supplied to input terminals 34 and 39. Also other networks than one-shot multivibrator 15 and emitter follower amplifier 16 could be employed for providing the necessary sync signal to be delivered to horizontal deflection circuits 25 to produce a sawtooth deflection voltage sub-harmonically related to the signal applied to input terminal 26. Also other circuitry could be employed for deriving the audio signal that is applied to input terminals 37 and 38 while still maintaining this signal as a sub-multiple of the signal applied to input terminal 26.

Strictly by way of example, the following Harman

Kardon networks may be used in the system of FIG. 1.

Component:                          Harmon Kardon type
    Schmitt trigger circuits 10 and 11 _____ ST-8204
    Astable multivibrators 12, 13 and 14 ____ MV-210
    One-shot multivibrator 15 _____ SS-215
    Emitter follower amplifier 16 _____ EF-221
    Phase inverting amlifier 18 _____ MM-212
    Emitter follower amplifier 17 _____ EF-221

It should be noted that it is not essential for the signal at input terminal 26 to have a frequency of 19 kHz. or 38 kHz. However, the more the frequency of the signal deviates from these values, the more difficult it will be for the aligner to make any meaningful determination of the degree of cross talk that is present. This is because there always will be present superimposed on the viewed signal a 38 kHz. ripple derived from the decoder. As long as the following conditions are met, this 38 kHz. ripple will remain stationary enabling a determination of the degree of cross talk to be made, otherwise this ripple will move, making this determination very difficult:

(a) signals applied to terminals 44 and 41 must be submultiples of and derived from the 38 kHz. sub-carrier or the 19 kHz. pilot carrier, (b) signals applied to terminals 37 and 38 must be submultiples of and derived from the 38 kHz. subcarrier of the 19 kHz. pilot carrier, and (c) the horizontal deflection voltage must be a submultiple of and derived from the 38 kHz. subcarrier or the 19 kHz. pilot carrier.

While various modifications of this invention have been disclosed herein, those skilled in the art will appreciate that changes and modifications may be made without departing from the spirit and scope of this invention as defined in the appended claims.

What I claim is:

1. Apparatus for producing a test signal for testing the alignment of a decoder for an F.M. receiver adapted to receive a composite signal containing a monophonic signal $(L+R)$, a pilot carrier and the sideband frequencies of a carrier suppressed carrier amplitude modulated by an $L-R$ signal, said suppressed carrier being of a frequency harmonically related to the frequency of said pilot carrier, and to separate L and R audio frequency signals from said composite signals comprising: means for providing at least one switching signal, each cycle of said switching signal being constituted by a first pulse going towards one polarity and occurring during a first time interval followed by a second pulse going towards the opposite polarity and occurring during a second time interval, said second time interval occurring after said first time interval; means providing at least one second signal; first gating means having first and second input terminals and an output terminal; second gating means having first and second input terminals and an output terminal; said first gating means being of a type that is adapted to be gated on to pass said second signal during application of said second signal to said second input terminal of said first gating means in coincidence with application of a switching signal to said first input terminal of said first gating means and during said first time interval and that is adapted to be gated off to block passage of said second signal during application of said second signal to said second input terminal of said first gating means in coincidence with application of a switching signal to said first input terminal of said first gating means and during said second time interval, said second gating means being of a type that is adapted to be gated on to pass said second signal during application of said second signal to said second input terminal of said second gating means in coincidence with application of a switching signal to said first input terminal of said second gating means and during said second time interval and that is adapted to be gated off to block passage of said second signal during application of said second signal to said second input terminal of said second gating means in coincidence with application of a switching signal to said first input terminal of said second gating means and during said first time interval; means connecting said means for providing said switching signal and said first input terminals for applying said switching signal to said first input terminals; means connecting said means providing said second signal and said second input terminals for applying said second signal to said second input terminals, whereby said second signal appears at said output terminal of said first gating means during said first time interval and at said output terminal of said second gating means during said second time interval; and means connected to said output terminals for producing a composite signal of the form $$(L+R)+(L-R)\cos \omega t + P \cos \frac{\omega}{2}t$$

where L is said signal appearing at one of said output terminals, R is said signal appearing at the other of the said output terminals and P is the amplitude of said pilot carrier.

2. Apparatus according to claim 1 wherein the frequency of second signal is greater than the frequency of said switching signal.

3. Apparatus according to claim 2 wherein the frequency of said second signal is at least twice the frequency of said switching signal.

4. Apparatus according to claim 3 wherein said second signal is an audio signal.

5. Apparatus according to claim 1 wherein said means for providing said switching signal and said second signal comprise means for deriving said switching signal and said second signal from a third signal, said switching signal and said second signal being sub-harmonics of said third signal.

6. Apparatus according to claim 5 wherein said third signal is said pilot carrier.

7. Apparatus according to claim 5 wherein said third signal is said suppressed carrier.

8. Apparatus according to claim 6 wherein the frequency of said second signal is at least twice the frequency of said switching signal.

9. Apparatus according to claim 8 wherein said second signal is an audio signal.

10. Apparatus according to claim 5 wherein said means for deriving said second signal include a series tuned network.

11. Apparatus according to claim 1 wherein said means for providing said switching signal comprise first converting means for converting a third signal into a fourth signal having a square waveform and the same frequency as said third signal; means for applying said third signal to said first converting means to be converted into said fourth signal; means for harmonically dividing said fourth signal to provide a fifth signal having a frequency corresponding to the frequency of said switching signal; means for applying said fourth signal to said means for harmonically dividing said fourth signal, whereby said fifth signal is produced; second converting means for converting said fifth signal into said switching signal having a square waveform and the same frequency as the frequency of said fifth signal; and means for applying said fifth signal to said second converting means, whereby said switching signal is produced.

12. Apparatus according to claim 11 wherein said first and second converting means are squaring amplifiers.

13. Apparatus according to claim 12 wherein said squaring amplifiers are Schmitt trigger circuits and including means for varying the trigger point of said second converting means, whereby the relative durations of said first and second time intervals with respect to each other may be varied.

14. Apparatus according to claim 11 wherein said means providing said second signal comprise means for deriving from said means for harmonically dividing said fourth signal a sixth signal harmonically related to said third signal and corresponding in frequency to the frequency of said second signal; third converting means for converting said sixth signal into said second signal having a sine waveform and the same frequency as the frequency of said second signal; and means for applying said sixth signal to said third converting means, whereby said second signal is produced.

15. Apparatus according to claim 14 wherein said third converting means is a series tuned network tuned to the frequency of said second signal.

16. Apparatus according to claim 14 wherein the frequency of said second signal is at least twice the frequency of said switching signal.

17. Apparatus according to claim 16 wherein said third signal is said pilot carrier.

18. Apparatus according to claim 1 including a decoder having first and second output terminals, said decoder being adapted to decode said composite signal and reproduce said L signal at one of said output terminals thereof and said R signal at the other of said output terminals thereof; an oscilloscope including a cathode ray tube and horizontal and vertical deflection networks; and means for applying said signals appearing at said output terminals of said decoder to said vertical deflection network for display by said cathode ray tube.

19. Apparatus according to claim 18 including means for deriving a seventh signal at a frequency that is either equal to or a subharmonic of the frequency of said switching signal; and means for applying said seventh signal to said horizontal deflection network to generate a sawtooth deflection voltage equal in frequency to or a sub-harmonic of said switching signal.

20. Apparatus according to claim 19 wherein said means for providing said switching signal comprise first converting means for converting a third signal into a fourth signal having a square waveform and the same frequency as said third signal; means for applying said third signal to said first converting means to be converted into said fourth signal; means for harmonically dividing said fourth signal to provide a fifth signal having a frequency corresponding to the frequency of said switching signal; means for applying said fourth signal to said means for harmonically dividing said fourth signal, whereby said fifth signal is produced; second converting means for converting said fifth signal into said switching signal having a square waveform and the same frequency as the frequency of said fifth signal; and means for applying said fifth signal to said second converting means, whereby said switching signal is produced.

21. Apparatus according to claim 20 wherein said means providing said second signal comprise means for deriving from said means for harmonically dividing said fourth signal a sixth signal harmonically related to said third signal and corresponding in frequency to the frequency of said second signal; third converting means for converting said sixth signal into said second signal having a sine waveform and the same frequency as the frequency of said second signal; and means for applying said sixth signal to said third converting means, whereby said second sginal is produced.

22. Apparatus according to claim 21 wherein said third converting means is a series tuned network tuned to the frequency of said second signal.

23. Apparatus according to claim 21 wherein the frequency of said second signal is at least twice the frequency of said switching signal.

24. Apparatus according to claim 23 wherein said third signal is said pilot carrier.

25. Apparatus according to claim 24 wherein said first and second converting means are Schmitt trigger circuits.

26. Apparatus according to claim 25 including means for varying the trigger point of said second converting means, whereby the relative duration of said first and second time intervals with respect to each other may be varied.

27. Apparatus according to claim 19 wherein said means for providing said switching signal and said second signal comprise means for deriving said switching signal and said second signal from a third signal, said switching signal and said second signal being sub-harmonics of said third signal.

28. Apparatus according to claim 27 wherein said seventh signal is derived from said third signal.

29. Apparatus according to claim 28 wherein said third signal is said pilot carrier.

30. Apparatus according to claim 28 wherein said third signal is said suppressed carrier.

31. Apparatus according to claim 29 wherein the frequency of said second signal is at least twice the frequency of said switching signal.

No references cited.

KATHLEEN H. CLAFFY, Primary Examiner

T. J. D'AMICO, Assistant Examiner